US006539302B1

(12) United States Patent
Bender et al.

(10) Patent No.: US 6,539,302 B1
(45) Date of Patent: Mar. 25, 2003

(54) METHOD, SYSTEM, AND ARTICLE OF MANUFACTURE FOR PROVIDING NOTIFICATION OF TRAFFIC CONDITIONS

(75) Inventors: Raymond Bender, Elgin, IL (US); Michael Brian Lane, Morton Grove, IL (US); Laurence Paul Lehman, Lombard, IL (US)

(73) Assignee: Navigation Technologies Corporation, Rosemont, IL (US)

( * ) Notice: Subject to any disclaimer, the term of this patent is extended or adjusted under 35 U.S.C. 154(b) by 0 days.

(21) Appl. No.: 09/656,408

(22) Filed: Sep. 6, 2000

(51) Int. Cl.[7] .......................... G06G 7/78; G01C 21/30; G08G 1/09
(52) U.S. Cl. ...................... 701/202; 701/117; 340/905
(58) Field of Search .............................. 701/117, 202, 701/208, 201, 211, 118, 209; 340/905, 995, 990, 989; 348/149

(56) References Cited

U.S. PATENT DOCUMENTS

| | | | | |
|---|---|---|---|---|
| 5,031,104 A | * | 7/1991 | Ikeda et al. | 364/449 |
| 5,173,691 A | * | 12/1992 | Sumner | 340/905 |
| 5,523,950 A | * | 6/1996 | Peterson | 364/436 |
| 5,774,827 A | | 6/1998 | Smith, Jr. et al. | 701/209 |
| 5,850,190 A | | 12/1998 | Wicks et al. | 340/905 |
| 5,878,368 A | * | 3/1999 | Degraaf | 701/209 |
| 5,948,040 A | * | 9/1999 | Delorme et al. | 701/201 |
| 5,985,229 A | * | 11/1999 | Lappenbusch et al. | 340/905 |
| 6,073,112 A | * | 6/2000 | Geerlings | 705/14 |
| 6,148,260 A | * | 11/2000 | Musk et al. | 701/200 |
| 6,209,026 B1 | * | 3/2001 | Ran et al. | 709/218 |
| 6,256,577 B1 | * | 7/2001 | Graunke | 701/117 |
| 6,321,158 B1 | * | 11/2001 | Delorme et al. | 701/201 |

OTHER PUBLICATIONS

Web pages, Traffic Online Tutorial (http://www.trafficonline.com/tolfree/tutorial.html), pp. 1–7.
Web pages, Traffic Online Freeware (http://www.trafficonline.com/tolfree/freeware.html), pp. 1–2.
Web pages, TranSmart Technologies, Inc. (http://www.trafficonline.com), p. 1–1.

* cited by examiner

*Primary Examiner*—Tan Q. Nguyen
*Assistant Examiner*—Dalena Tran

(57) ABSTRACT

A web-based traffic notification service permits end users to select travel routes and automatically receive notification of routes having the fastest travel times. The service can be provided by a website configured to display an interface that allows users to create accounts for storing personal travel information. The travel information includes origin, destination, way point, and departure time data for trips selected by the user. For each trip, alternative routes are designated. At or near the selected departure time of a trip, travel times for the alternative routes are computed using real-time traffic data. The user is then automatically notified of the route having the fastest travel time using an email or voice message. The service can be configured so that the user is notified only when the travel time of a user-defined preferred route is longer than a secondary alternative route. In addition, the user can request via voice telephony or a web-enabled device an immediate update of the best route if departure time is the present time. The service can also deliver to users merchant information and enroute notification of traffic incidents causing unexpected delays.

25 Claims, 5 Drawing Sheets

USER TRIP RECORD

| USER ID | TRIP ID | DEPARTURE TIME | NOTIFICATION TIME | ORIGIN | DESTINATION | WAY POINT 1 | ROUTE 1 | ROUTE 2 | ROUTE 3 | NOTIFICATION MODE |
|---|---|---|---|---|---|---|---|---|---|---|
| 121 | 122 | 124 | 126 | 128 | 130 | 132 | 134 | 136 | 138 | 140 |

MERCHANT AD RECORD

| LOCATION | CLASS | VALID TIME | AD CONTENT | RESTRICTIONS |
|---|---|---|---|---|
| 162 | 164 | 166 | 168 | 170 |

METHOD, SYSTEM, AND ARTICLE OF MANUFACTURE FOR PROVIDING NOTIFICATION OF TRAFFIC CONDITIONS

TECHNICAL FIELD OF THE INVENTION

The present invention relates generally to traffic information systems, and in particular, to a notification service based on real-time traffic conditions.

BACKGROUND OF THE INVENTION

Internet-based websites are available that provide travelers with real-time traffic and road construction information. In addition, there are also websites that provide notification to travelers so that they may be automatically warned of abnormal travel times via automatic voice or email messages. For example, TrafficOnline (www.trafficonline.com) provides a personalized service that allows end users to select highway routes and maximum allowable travel times. At user-selected update times, the travel times of the highway routes are computed using real-time traffic data. If the estimated travel time for a route exceeds the user defined maximum travel time, a notification is sent to the user alerting him/her of the abnormally long travel time. The notification is sent by way of email or voicemail.

Although present traffic notification websites provide useful services for some users, they make no provisions for selecting alternative routes. Specifically, an end user is simply notified of abnormally long travel times without any notification of shorter alternative routes. This limits the usefulness of current traffic notification websites.

Another consideration with known traffic notification sites is that they do not automatically select routes between travel endpoints. Instead, an end user manually selects route segments between trip endpoints to specify a complete, (or typically partial, i.e. highway portion only) travel route. This manual technique of entering route information can be inconvenient for some users.

Accordingly, there is a need for an improved traffic notification service that can automatically select travel routes and provide notification of alternative routes.

BRIEF DESCRIPTIONS OF THE DRAWINGS

FIG. 4 is a diagram illustrating an exemplary database record format for trip information.

FIG. 5 is a diagram illustrating an exemplary database record format for storing merchant information.

DETAILED DESCRIPTION OF THE PRESENTLY PREFERRED EMBODIMENT(S)

Figure 1:
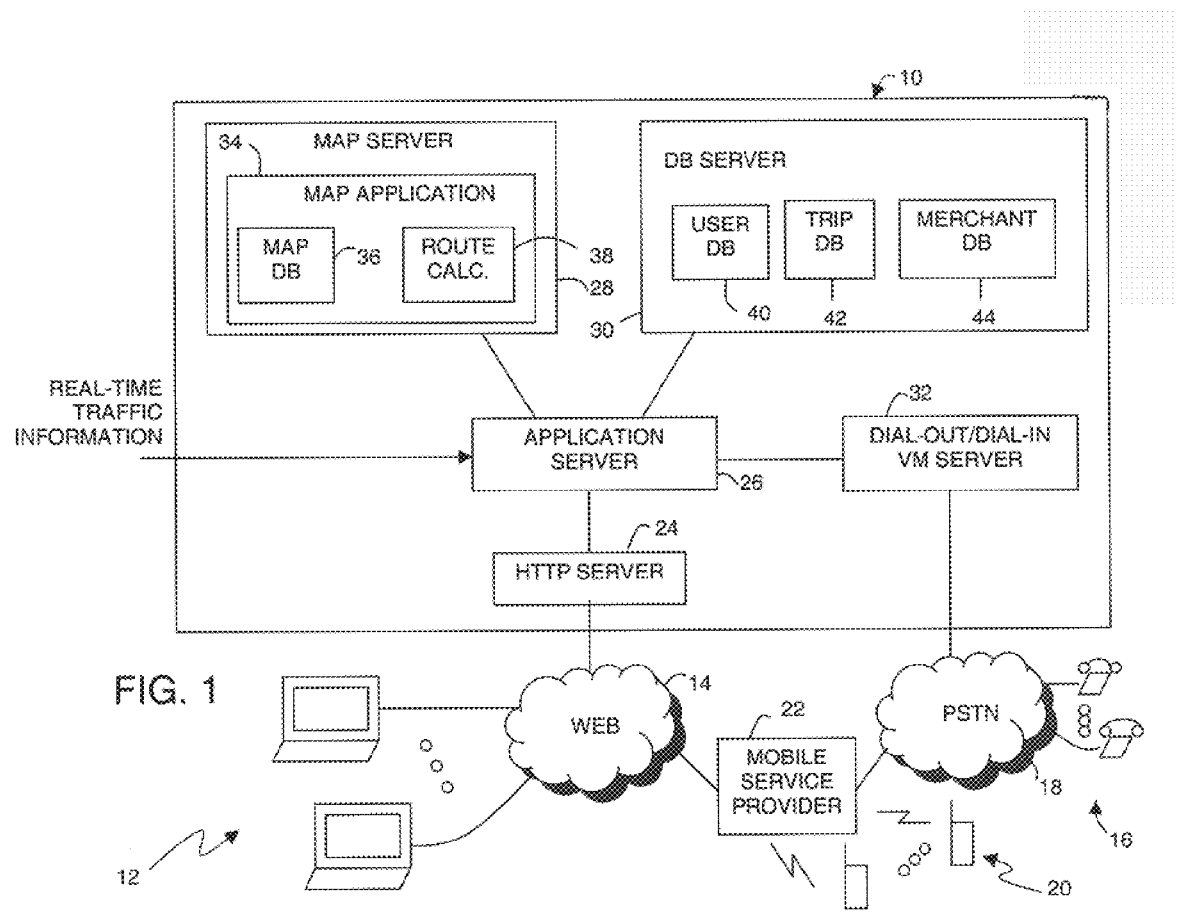
FIG. 1 is a block diagram of an exemplary traffic notification system in accordance with an embodiment of the present invention.

Referring now to the drawings, and in particular to FIG. 1, there is illustrated an exemplary traffic notification system 10. The system 10 can include a conventional three-tiered website having an HTTP server 24, an application server 26, and one or more third-tiered servers 28–32, where the servers 24–32 are configured to collectively provide a novel traffic notification service that automatically selects travel routes and provides notification of the current fastest travel times. The notification system 10 can communicate with users by way of the World Wide Web (Web) 14 and also using standard voice telephony over the public switched telephone network (PSTN) 18.

Using conventional personal computers (PCs) running standard web browsers, end users can submit travel information to the notification system 10 over the web 14. In addition, end users may employ web-enabled wireless devices 20, such as cellular phones, pagers, personal digital assistance, and the like, to submit travel information over the web 14 by way of a mobile service provider 22. The travel information can include origin, destination, and way points for one or more trips, as well as anticipated departure times.

The submitted travel information is then used by the system 10 to create a plurality of routes connecting trip origins and trip destinations. The system 10 periodically updates estimated route travel times based on real-time traffic information (RTTI). The updates can be estimates of route travel times at user designated departure times. After updating the route travel times, the notification system 10 notifies the user of the fastest route. The notifications can be messages, such as email messages received at the end user PCs 12 or wireless devices 20 by way of the web 14, or voices message or pages received by the users' telephones 16 or wireless devices 20 over the PSTN 18.

The HTTP server 24 can be a commercially-available network server for managing communications between the end users and the application server 26 over the web 14. Among other things, the HTTP server 24 receives and processes HTTP requests from web users, and outputs to the web 14 HTTP responses directed to web users. The application server 26 includes software routines for translating incoming HTTP requests into formats usable by the map server 28, the database (DB) server 30, and the dial-out/dial-in/voicemail (VM) server 32. The functionality of the HTTP server 24 and application server 26 can be provided by one or more PCs running a standard networked operating system, such as Windows NT® from Microsoft Corp., and a standard web server program, such as an Apache Server available from the Apache Software Foundation, configured to perform the server functions as disclosed herein.

The map server 28 can be a personal computer running a standard operating system, such as Windows® from Microsoft Corp., and a map application 34. The map application 34 is a software program for interfacing to a map database (DB) 36, and includes a route calculation routine 38. The route calculation routine 38 can determine route travel times and automatically select best routes based on origin, way points, and destination points selected by users, as well as information contained in the map DB 36. The map DB 36 stores road information organized as a plurality of road segments. The road segments contain computer-usable information describing roadways, such as geographic location, addresses and traffic control devices along the segment, and estimated travel time. Suitable databases are available from Navigation Technologies Corp., of Rosemont, Ill. Method for performing route calculations are disclosed in co-pending U.S. patent application Ser. No. 09/047,698, which is hereby incorporated by reference.

A "look-aside" user interface to the map DB 36 can be provided for allowing the user to override the default segment cost (i.e., travel time) for a particular road segment, to more accurately reflect actual travel time, and to coerce the route calculation software to include or exclude a particular segment from a preferred or alternate route.

The database server 30 can include one or more PCs running a conventional database software program, such as Oracle 8i™, available from Oracle Corp. The database server 30 stores a user database 40, a trip database 42 and a merchant database 44. The user database stores information regarding users that subscribe to the notification service. The user information can be organized into respective user records, and can include data such as user name, home address, phone number, pager number, email address, preferred notification mode, password, user ID, and the like. The trip database 42 can be a relational database storing trip information for each of the users registered with the system 10. The merchant database 44 can store merchant advertisement and coupon information that is transferable to users based on their selected trips.

The dial-out/dial-in/VM server 32 provides voice notification to users of route travel times. The dial-out/dial-in/VM server 32 can be configured to provide voice mailboxes for users for storing traffic notification messages. This allows users to dial in to the system 10 to receive traffic notifications. In addition to voice mailboxes, the server 32 can be configured to provide an automated voice or touch tone menu that permits users to dial in and request immediate updates on route travel times.

With respect to dial-out functions, the server 32 can be configured to dial-out directly to user phone numbers to play back voice synthesized messages alerting users to traffic conditions and travel times. Suitable systems for performing the voicemail, dial-in, and dial-out functions are the BigmOuth and Goldmine systems available from Psychosoft Corp., of Oakland, Calif.

Figure 2:
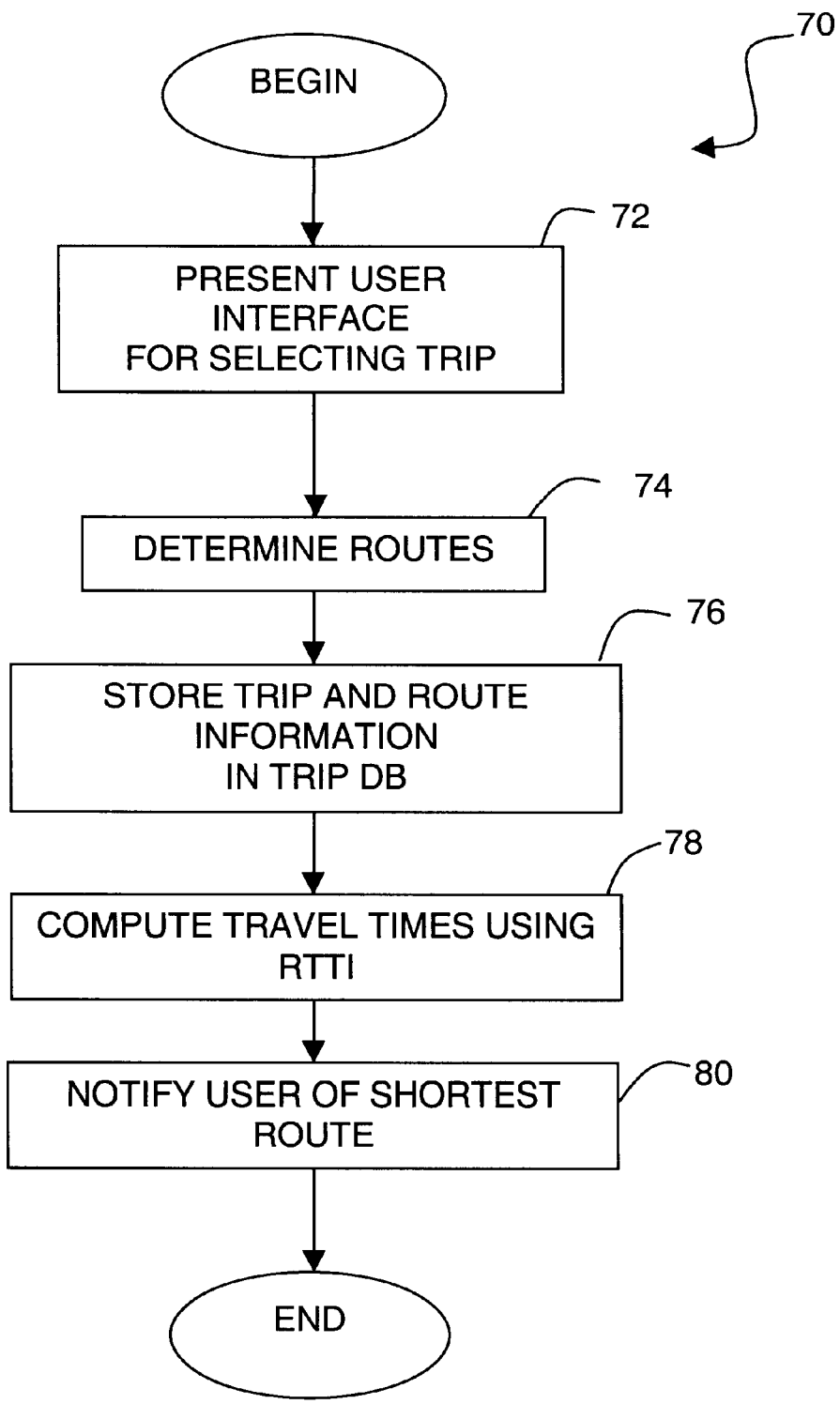
FIG. 2 is a flow diagram illustrating a method of operating the system of FIG. 1.

FIG. 2 is a flow chart diagram 70 illustrating a method of providing a traffic notification service using the system 10 shown in FIG. 1. In step 72, a computer-displayable user interface is generated by the system 10 for permitting an end user to select a trip. The interface can be generated by the application server 26 in response to an HTTP request received over the web 14 from one of the enduser devices 12, 20. The interface can be a web page represented by HTML (hypertext markup language). The web page can include an HTML form permitting an end user to enter information, such as a trip identifier, an origin point, a destination point, and any intermediate way points located between the origin and destination points. The origin, destination, and way points can be specified by the user as street addresses in a particular city and state. The form can also allow the user to enter an optional notify time and departure time. After completing the form presented in the web page, the end user can submit the form to the system 10 over the web 14. The information in the HTML form is then passed to the application server 26.

In addition to the form, the interface can display a map of roadways. As an alternative to entering a street address and location in a form, the map can include links associated with segments or points on the map. The links can call one or more common gateway interface (CGI) programs that generate coordinates representing locations on the map. In this manner, origin, destination, and way points can be selected graphically by the user clicking the map to select points or segments.

The application server 26 can include a software routine, such as a common gateway interface (CGI) program that translates the HTML trip information into a predetermined format usable by the map application 34. Software routines can be included on the application server 26 that provide a software interface for automatically submitting the translated trip information to the route calculator 38 of the map application 34.

Based on the origin, destination, and way points, the route calculator 38 automatically determines an estimated fastest route connecting the trip points (step 74). One way the route calculator 38 can accomplish this is by constructing various paths connecting the user input points. These paths consist of road segments retrieved from the map database 36. Each road segment stored in the map database 36 has an associated travel time. The route calculation software 38 creates a number of routes between points, and then sums the segment times to generate a plurality of route travel times. These route travel times are prioritized according to the fastest route.

The route calculation software 38 returns a predetermined number of best routes, each route being designated by one or more road segments and a total estimated travel time. For example, for each trip entered by a user, the route calculator 38 can return four routes representing the four fastest estimated travel times between the user-selected trip points. The trip points selected by the route calculator 38 can be presented to the user in an HTML web page that is sent to the user device 12, 20 and as HTTP response. Using standard HTTP data types, the web page can display a graphical representation of a map depicting each route, as well as text giving driving directions and the estimated travel time. One or more links can be included in the web page for allowing the user to select one of the routes as a preferred route.

The application server 26 then stores the user input trip information and selections and the route information returned by the route calculator 38 in the trip database 42 (step 76). For each trip, the user designates a departure time and a notification time. The departure time indicates when the user anticipates beginning the trip. The notification time, on the other hand, indicates when the user desires to be notified of the traffic conditions on the route. Usually, the notification time is designated to occur shortly before the departure time.

At or near the user-selected notification time, the application server 26 computes route travel times using the current RTTI, provided the user has configured automatic notification. The RTTI can be traffic congestion information. One way to gather this information is by using sensors placed on the roadways to measure traffic flow. Such RTTI is publicly available from various state and local government agencies. For example, the Illinois Department of Transportation (IDOT) provides road segment travel time information at a publicly accessible website. Such information can be used by the application server 26 to update the current travel time for routes stored in the trip database 42. The application server 26 can compute route travel times by downloading the publicly available traffic information and converting it into a format consistent with the road segments stored for each trip in the trip database 42. After computing the current travel times for the routes, the application server 26 notifies the user of the fastest route (step 80).

The user can be notified by way of the web 14 using an email message. Alternatively, the user can be notified by voice message or pager over the PSTN 18. The dial-out/dial-in/VM server 32 can either store a voicemail message for later retrieval by the user, or it can directly call the user to play back a voice synthesized message indicating the fastest route.

To avoid unnecessarily notifying the user, the application server 26 can be configured to notify the user only when a preferred travel route is no longer the fastest route for the trip. As discussed above, the trip selection interface can include a web page form that permits the user to select a preferred route after the route calculator 38 generates a list of best routes. The preferred route information can be stored in the trip database 42. In this manner, the application server 26 is alerted to the preferences of the user and notifies the user only when the preferred route is no longer the fastest.

In addition to notifying users of the fastest routes, the system 10 can be configured to notify users of traffic incidents that occur while the users are traveling their routes. A traffic incident is an occurrence, such as an accident, that adds significant delay to a route travel time.

To achieve incident notification, the application server 26 receives incident alerts from the RTTI. From the route travel times and user-selected departure time, the server 26 can determine whether an incident occurs during a user trip. If an incident occurs during this period, the server 26 generates an incident notification message for immediate dispatch to the user, via any of the communication paths described herein, warning that a significant delay has been detected along the route and also giving the location of the delay. The traveler can then decide whether to stay on the route or try a different route.

Figure 3:
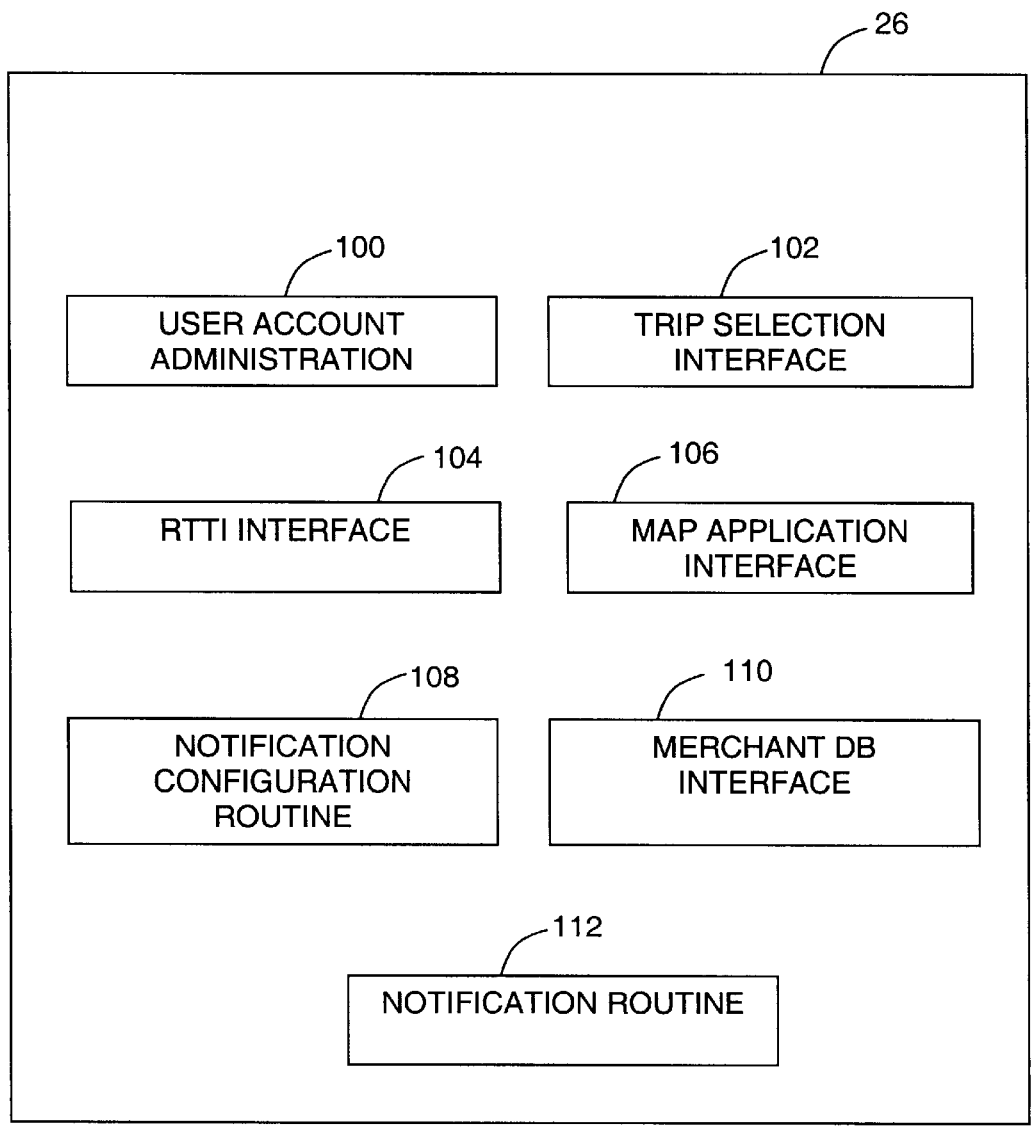
FIG. 3 is a block diagram illustrating components of the application server shown in FIG. 1.

FIG. 3 is a block diagram illustrating the components of the application server 26. Each of the components can be a software routine/program executable by the application server 26. The components include a user account administration routine 100, a trip selection interface 102, an RTTI interface 104, a map application interface 106, a notification configuration routine 108, a merchant database interface 110, and a notification routine 112.

The user account administration routine 100 presents one or more HTML web pages to users by way of the web 14 permitting them to establish user accounts and enter user information. The user information includes a user name, home address, business address, email address, phone number, pager number, fax number, user ID, password, and the like. The user information can also include a user preference as to whether the user desires to receive merchant advertisements related to the trip information entered into the system. If a user prefers to receive this information, the system automatically generates emails containing merchant advertisements and/or coupons that are delivered to the user based on the trip information entered by the user.

The trip selection interface 102 generates HTML web page forms permitting the user to enter origin, destination, and way point information regarding one or more trips planned by the user. In addition, for each trip the user enters a departure time. A notification time can also be entered through the interface 102.

The RTTI interface 104 allows the application server 26 to retrieve real-time traffic information from available sources. The interface 104 can include any means for retrieving the information, such as a conventional network interface to a website, or a dedicated network link to a real-time traffic data gathering system.

The map application interface 106 can be a software routine that translates HTML formatted trip information into a format usable by the map application 34. In addition, the interface 106 can include one or more software routines for executing an interface protocol or command-like keystrokes necessary to transfer the translated trip information to the map application 34.

The notification configuration routine 108 presents a web page interface to end users, allowing them to tailor the notification function to their needs. The notification configuration 108 can be one or more web pages represented by HTML for permitting end users to specify the notification mode, i.e., voice message, email, page message, or the like. In addition, the notification configuration 108 allows end users the option of being notified only when a preferred route is no longer the fastest route for a trip.

The merchant database interface 110 can be a software routine that permits system administrators to enter merchant advertisement and coupon information into the merchant database 44. The interface 110 also includes one or more software routines for automatically emailing merchant information to end users based on the geographic location of the merchants and the location of user selected trips. Accordingly, the interface 110 presents merchant coupons and information to end users for merchant outlets located along trip routes. This is accomplished by first determining whether the user has authorized email delivery of merchant information. If so, the merchant interface 110 compares user route information stored in the trip DB 42 with merchant location information in the merchant DB 44. Upon finding a registered merchant located along one of the routes, the interface 110, retrieves merchant information, such as retail coupons, and emails it to the user based on the user's email address stored in the user DB 40.

The notification routine 112 generates traffic notification messages to end users. The routine 112 accomplishes this by retrieving notification times for all of the trips recorded in the trip database 42. These notification times are then organized into a schedule. The routine 112 is configured to periodically update the schedule by regularly checking the trip database 42 for new trip entries. A trip ID and user ID are maintained for each notification time entered into the schedule. The notification routine 112 relies on a system timer to maintain the current time.

When a notification time in the schedule is equal to the current time, or when a user logs into the http server 24 or calls the automated phone system 33 and requests the best route for an immediate departure time, the notification routine 112 retrieves RTTI for each of the stored routes associated with the particular trip. The routine 112 then computes the travel times for each of the routes based on the RTTI. If the user has logged into the website the best route is displayed on his web-enabled device including text giving driving directions and estimated travel time. If the user has called using a telephone via the automated dial-in phone system, the best route is audibilized to him. If the route calculation was initiated by the automatic scheduler, the routine 112 can determine the notification mode selected by the user and also retrieves relevant notification information from the user database, such as the user's email, pager, or phone number. The appropriate message is then assembled by the notification routine 112 and transmitted to the end user using the selected means of notification.

As an alternative to using pre-configured, stored routes, a user can log in to the website and request the route calculation routine to execute again, using RTTI, rather than estimated segment travel times to determine if there is a faster route that is not included in the stored routes for a particular trip. In this manner, all possible routes connecting origin, destination, and way points for a trip can be examined under current traffic conditions to select the best route.

FIG. 4 illustrates an exemplary trip record format 120 usable by the trip database 42. The user trip record 120 includes a user ID field 121, a trip ID field 122, a departure time field 124, a notification time field 126, an origin location field 128, a destination location field 130, a way point field 132, a first route field 134, a second route field 136, a third route field 138, and a notification mode field 140.

The user ID 121 can be a text field identifying the user associated with the trip. The trip ID 122 can be a field for storing user-entered text identifying the trip. The departure time 124 can be a text field defining or storing the user-entered departure time, and the notification time can be a text field storing a user-entered notification time.

The origin 128, the destination 130, the way point 132 can be fields for storing location information for the trip points entered by the user. The location information can include a street address, city, state or country. Although only one way point is illustrated, any number of way points can be identified and stored for a particular trip.

The routes 134–138 include road segment information for defining routes between each of the trip points. The road segment information can include data retrieved from the map DB 36. The first route 134 can store the preferred route if the user selects a preferred route. Although three routes are illustrated, the system 10 can be configured to store any number of routes for each trip.

The notification mode 140 is a text field that stores a flag indicating the mode by which the user prefers to be notified. The flag can indicate that the user prefers to be notified by email, voice mail, direct dial-out voice message, or page message. In addition, a flag can be included that indicates that the user prefers to be notified using all available communication modes, including voice message, email, and pager.

FIG. 5 is an exemplary record format 160 illustrating a merchant ad record stored in the merchant database 44. The merchant ad record 160 includes a location field 162, a class field 164, a valid time field 166, an ad content field 168, and a restriction field 170. The location field 162 can store information regarding the location of the merchant outlet. The location information is stored in a format so that it can be compared against route information stored in a user trip record. The merchant interface 110 can compare the content of the location field 162 to the route information of various user trips to determine whether the merchant ad represented by the record should be forwarded to the user.

The class field 164 classifies the record according to the type of merchant. For example, classes can be created for restaurants, retail outlets, services, etc.

The valid time field 166 is compared against the departure time 124 of user trip record to determine whether a particular user will be traveling near the merchant at a predetermined time specified by the field 166. In this manner, the merchant ads can be distributed in a timely manner for time sensitive services, such as restaurants serving breakfast, lunch and dinner.

The ad content field 168 can include a text defining the merchant information to be distributed, or alternatively, a pointer to a file that contains the merchant information to be distributed to the users.

The restrictions field 170 can be used to enforce various restrictions on the distribution of merchant ads. For example, to prevent the distribution of bar and nightclub advertisements to minors, a specific restriction to this effect can be placed in the restrictions field 170.

Figure 6:
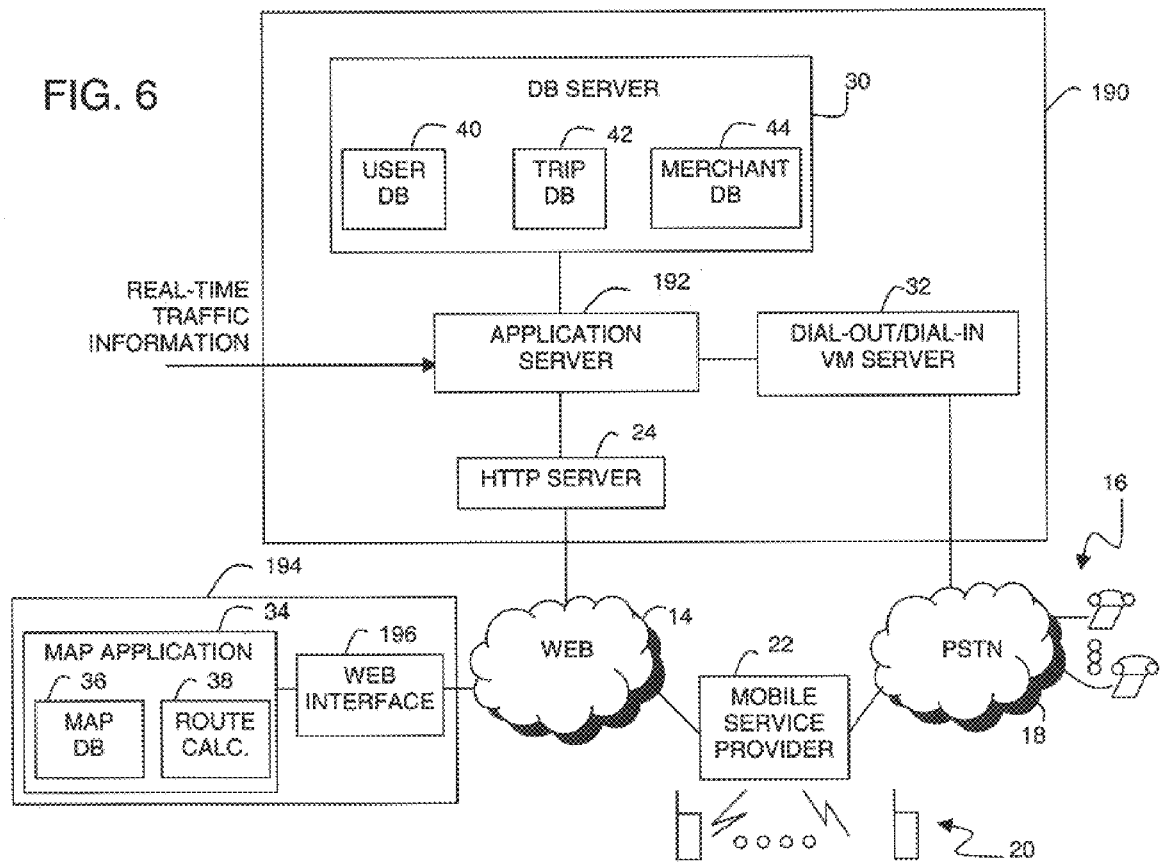
FIG. 6 is a block diagram illustrating an alternative architecture for a traffic notification system in accordance with a further embodiment of the present invention.

FIG. 6 is a block diagram of a system 190 in accordance with an alternative embodiment of the present invention.

The notification system 190 is configured to receive trip information from an end user device 194, where the device 194 includes the map application 34. The architecture shown in FIG. 6 permits the end users to locally compute the best routes. A locally executed map application can decrease the amount of time it takes to determine the best routes, because of dedicated CPU resources and reduced network traffic delays.

A web interface 196 is included in the end user device 194 for allowing the map application 34 to transfer route information to the system 190, where it is then stored in the trip database 42. The web interface 196 can include a software routine for emailing road segment information for each trip route to the system 190. The HTTP server 24 and application server 192 can be configured to receive and translate the email messages and the information therein into the database format shown in FIG. 4. The other functions of the system 190 are as described herein with reference to FIGS. 1–5.

An article of manufacture, such as a computer-usable medium, can store one or more computer programs for configuring one or more computers to perform the functions of the systems 10, 190 disclosed herein. The computer-usable medium can be any article for storing computer programs, such as a CD ROM, hard drive, DVD, diskette, solid-state memory such as a RAM or ROM, or the like.

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed is:

1. A method of providing route information to users comprising:

providing a server that has a route calculation software application that uses a geographic database to determine routes between locations specified by each of said users;

providing access to the server so that each of said users can designate a plurality of different user known routes by which a trip between a starting location and a destination can be made;

storing data indicating the plurality of different routes designated by each of said users on said server;

on said server, determining which of said plurality of different routes is fastest, given a specific departure time and taking into account real time traffic information that pertains to said departure time and said plurality of different routes; and informing the user who designated the plurality of different routes which of said plurality of different routes is fastest.

2. The method of claim 1 wherein said plurality of different routes are defined by road segment information.

3. The method of claim 1 further comprising:

allowing each of said users to indicate one of said plurality of different routes as a preferred route.

4. The method of claim 1 further comprising:

allowing the user to indicate the specific departure time for said trip.

5. The method of claim 1 further comprising:

storing data on the server to indicate the departure time to be associated with each trip.

6. The method of claim 1 further comprising:
allowing the user to indicate a notification time to be associated with each trip; and
performing said step of informing at said notification time.

7. The method of claim 1 wherein said informing is performed by email.

8. The method of claim 1 wherein said informing is performed by voice message.

9. The method of claim 1 wherein said informing is performed by pager.

10. The method of claim 1 further comprising:
after the step of informing, warning the user about a delay that arises with respect to said plurality of different routes subsequent to the step of informing.

11. The method of claim 1 further comprising:
allowing the user to indicate whether to receive merchant information based on the plurality of different routes designated by the user.

12. The method of claim 1 further comprising:
comparing each of said plurality of different routes of each of said users to merchant location information indicating locations of merchants; and
for merchant location located along any of said routes, providing the user associated therewith with information about said merchant.

13. The method of claim 1 wherein said step of informing is performed when the user accesses the server to be informed of which of said plurality of different routes is fastest.

14. The method of claim 1 wherein the specific departure time is immediately when the user accesses the server to be informed of which of said plurality of different routes is fastest.

15. The method of claim 1 further comprising:
allowing the user to select text to identify the trip.

16. The method of claim 1 further comprising:
informing the user if a route other than any one of the plurality of different routes designated by the user is faster than any of the plurality of different routes designated by the user.

17. The method of claim 16 further wherein said step of informing the user if a route other than any one of the plurality of different routes designated by the user is faster than any of the plurality of different routes designated by the user is made in response to a request from the user.

18. The method of claim 1 further comprising:
on a local computer operated by the user, determining the plurality of different routes; and
transferring data indicating the locally determined plurality of different routes from the local computer to the server in order to designate the plurality of different routes by which a trip can be made between the starting location and the destination.

19. A method of providing route information to users comprising:
providing a server that has a route calculation software application that uses a geographic database to determine different routes between locations specified by each of said users;
providing access to the server so that each of said users can designate a plurality of different user known routes by which a trip between a starting location and a destination can be made;
storing data indicating the plurality of different routes designated by each of said users on said server;
on said server, determining which of said plurality of different routes is fastest, given a specific departure time and taking into account real time traffic information that pertains to said departure time and said plurality of different routes; and
informing the user if one of the plurality of different routes is faster than that one of the plurality of different routes that had been designated as a preferred route.

20. The method of claim 19 wherein said plurality of different routes are defined by road segment information.

21. The method of claim 19 further comprising:
allowing the user to indicate the specific departure time for said trip.

22. The method of claim 19 further comprising:
allowing the user to indicate a notification time to be associated with each trip; and
performing said step of informing at said notification time.

23. The method of claim 19 further comprising:
after the step of informing, warning the user about a delay that arises with respect to said plurality of different routes subsequent to the step of informing.

24. A system for providing route information to users comprising:
a geographic database;
a server having a route calculation software application that uses the geographic database to determine routes between locations specified by the users;
a first routine on the server and accessible to the users, wherein said routine accepts from each user a designation of a plurality of different user known routes by which a trip between a starting location and a destination can be made and stores data indicating the plurality of different user known routes designated by each user; and
a second routine on the server that determines which of said plurality of different routes is fastest, given a specific departure time and taking into account real time traffic information that pertains to said departure time and said plurality of different routes and informs the user who designated the plurality of different routes which of said plurality of different routes is fastest.

25. A method of providing route information to users comprising:
providing a server that has a route calculation software application that uses a geographic database to determine routes between locations specified by each of said users;
providing access to the server so that each of said users can designate a plurality of different routes by which a trip between a starting location and a destination can be made;
on said server, determining which of said plurality of different routes is fastest, given a specific departure time and taking into account real time traffic information that pertains to said departure time and said plurality of different routes;
informing the user who designated the plurality of different routes which of said plurality of different routes is fastest; and
warning the user about a delay that arises with respect to said plurality of different routes subsequent to the step of informing.

* * * * *